United States Patent [19]

Aldrin

[11] 4,187,601
[45] Feb. 12, 1980

[54] UNIVERSAL TYPE MACHINE TOOL

[76] Inventor: Per O. Aldrin, Strandpromenaden 25, 130 11 Saltsjö-Duvnäs, Sweden

[21] Appl. No.: 900,326

[22] Filed: Apr. 26, 1978

[30] Foreign Application Priority Data

May 4, 1977 [SE] Sweden ................... 7705179

[51] Int. Cl.² .................. B23C 1/12; B23C 1/14
[52] U.S. Cl. .................. 29/560; 29/26 R; 144/1 R; 409/191; 409/201; 409/221; 51/166 R
[58] Field of Search ............... 29/560, 26 R, 26 A, 29/27 R, 27 A, 27 C; 90/15 R, 15 A, 16, 17, 18, 19, 20; 144/1 R, 134 B, 134 C; 408/35, 236, 237; 51/166 R, 166 TS, 166 FB

[56] References Cited

FOREIGN PATENT DOCUMENTS

| | | | |
|---|---|---|---|
| 1262743 | 4/1961 | France ............................ 144/1 R |
| 524732 | 8/1940 | United Kingdom .................. 90/20 |
| 694632 | 7/1953 | United Kingdom ................ 29/26 R |

*Primary Examiner*—Z. R. Bilinsky
*Attorney, Agent, or Firm*—Frishauf, Holtz, Goodman & Woodward

[57] ABSTRACT

A universal type machine tool has a horizontal bed which, via a turnable intermediate slide, supports a rectangular work table, the slide being displaceable along the bed. A vertical column, displaceable along a bed perpendicular to the first bed has a second intermediate slide displaceable along the column and turnable around a horizontal axis. Its turnable portion carries a rectangular plate along which a foot plate for a drive unit is longitudinally displaceable. The foot plate supports a drive unit turnable around a horizontal axis and adapted alternatively to rotate a tool or a workpiece.

8 Claims, 6 Drawing Figures

UNIVERSAL TYPE MACHINE TOOL

The present invention relates to a universal type machine tool, comprising a horizontal bed along which there is displaceable an intermediate slide, the top portion of which can be rotated around a vertical axis. The intermediate slide supports a table which is adapted to retain the workpiece and which, by means of a lead screw, is displaceable in its longitudinal direction. The machine further comprises a vertical column along which there is displaceable a second rotatable intermediate slide, the outer portion of which supports a displaceable drive unit.

The type of work which can be carried out by means of the machine are, for example, milling, drilling, boring, turning, circular grinding and surface grinding.

The invention has two main objects. The one object is to provide a machine of the kind specified, the various components of which are shaped and arranged in such a way that the accessability of the tool is maximized. That the tool has a maximum accessiblity does, more specifically, mean both that the range of the tool is large in relation to the dimensions of the machine itself and that the tool can reach practically every arbitrary point within that three-dimensional range.

The second object of the invention, which partially overlaps the first one, is to provide a machine in which the workpiece and the tool, or the tool drive unit, are interchangeable.

A third object is to provide a machine of the type above defined in a simple way permitting the tool to move along planes which are inclined in one or two directions. The corresponding advantage of that possibility is that it avoids the very complicated and time-consuming work which in prior art machines has to be carried out for the purpose of instead causing the workpiece to assume a certain inclined position parallel with the plane along which the working operation shall take place.

A further object of the invention is to provide a machine tool of such a design that mutually different functions can be performed by means of components of the same structural nature. This means standardization and rationalization which in turn leads to economical advantages not only in terms of the manufacturing costs of the machine itself but also as far as the operational costs are concerned.

SUMMARY OF THE INVENTION

The realization of the above objects will, together with further advantages of the invention, appear from the following detailed specification. The main characteristic of a machine designed according to the invention is that the intermediate slide of its column supports a plate along which the drive unit is movable for fixation in various positions. The drive unit can itself be turned around a horizontal axis and the plate is, by means of a lead screw, feedable relative to the said intermediate slide.

Through e.g. British patent No. 524,732 there is previously known a machine tool comprising a horizontal bed with a guide along which an intermediate slide is displaceable. The top portion of the slide may turn around a vertical axis and it supports a workpiece-holding table which by means of a lead screw can be displaced in its longitudinal direction. The machine further comprises a vertical column having a second intermediate slide which is vertically displaceable along the column and the outer portion of which may turn around a horizontal axis. To the turnable outer portion of that slide there is secured a drive unit consisting of a tool holder and a related drive motor. The drive unit is displaceable in its longitudinal direction. It is, however, important to observe that the drive unit is displaceable only in the sense that it may be set in different desired positions. More particulary, it comprises a tube which by means of a surrounding clamping sleeve may be fixed in different positions. The drive unit is, however, not displaceable in the sense that it can be fed longitudinally or, otherwise put, it does not comprise any lead screw permitting continuous feeding of the tool during a working operation.

The term "drive unit" has been used here for reasons which will appear from the detailed specification. It comprises an electric motor, a spindle and, generally, also a gear box. The spindle may carry a tool holder, e.g. a chuck for drills. However, according to an important feature of the invention, the spindle may instead support and rotate the workpiece, the tool being stationary mounted on a portion of the machine.

DETAILED DESCRIPTION

Figure 1:
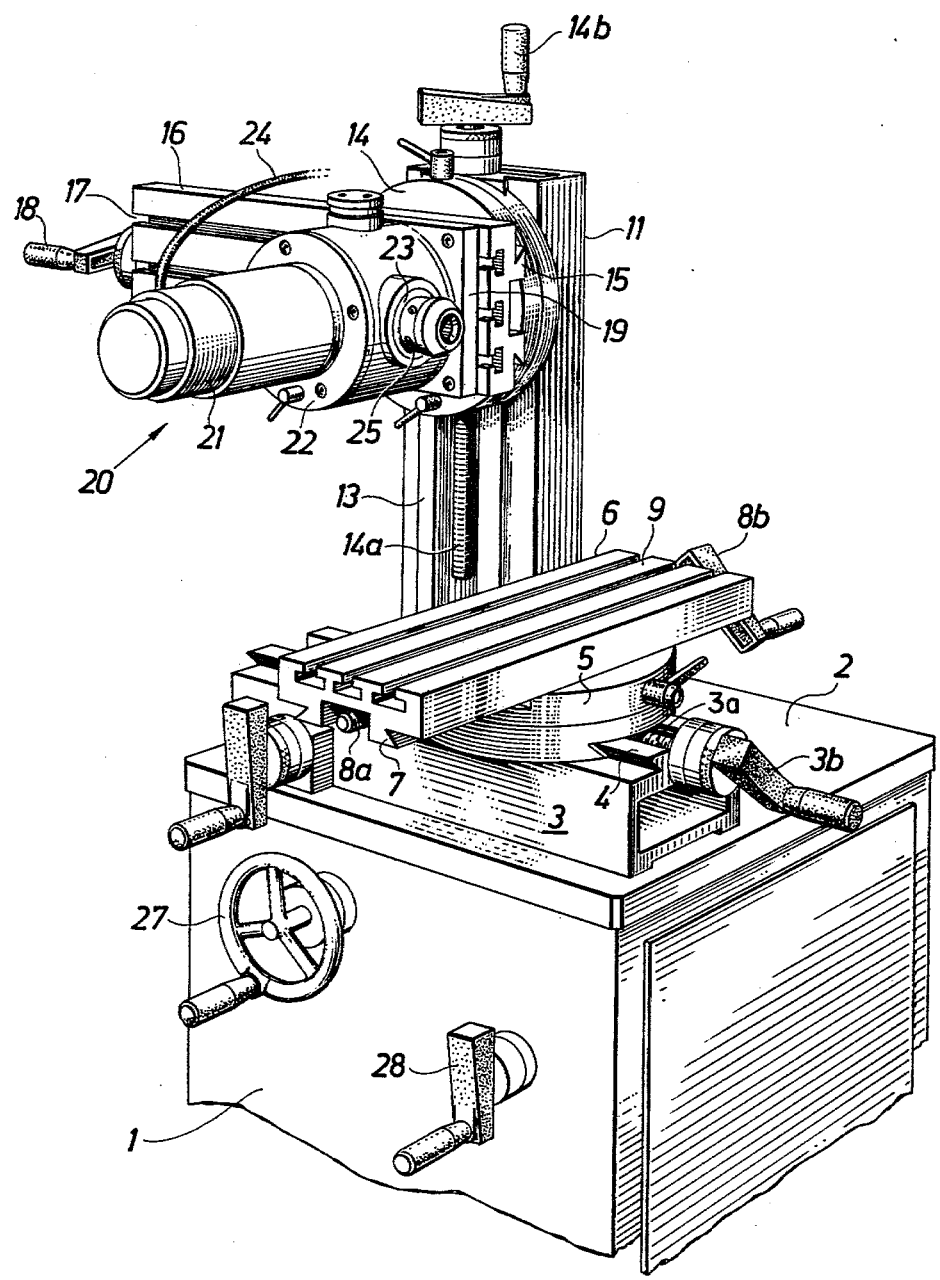
FIG. 1 is a perspective view showing a machine according to a first embodiment of the invention.

Referring to FIG. 1, the machine comprises a box-like frame 1, the top of which is covered by a square supporting plate 2. Frame 1 encloses the electrical equipment necessary for the drive motor of the machine and may also serve as a storing space for tools, etc. On top of plate 2 along one of its lateral edges there is mounted a bed 3 having a guide 4 of dovetail cross-section. Along bed 3 there is, by means of a lead screw 3a having a crank 3b, displaceably mounted an intermediate slide 5, the top portion of which is rotatable through 360° around a vertical axis. Slide 5 has two dovetail grooves receiving the guides 7 of a worktable 6. The worktable 6 is, in a conventional manner, longitudinally displaceable by means of a lead screw 8a which is manually rotatable with a crank 8b. The top surface of the worktable 6 has, also in a conventional manner, a number of longitudinal grooves 9. The cross-sectional shape of each such groove 9 corresponds to an inverted T. As is understood, workpieces can be clamped to the worktable 6 but, according to an important characteristic of the invention, worktable 6 may alternatively support tools, this feature being described below.

Figure 2:
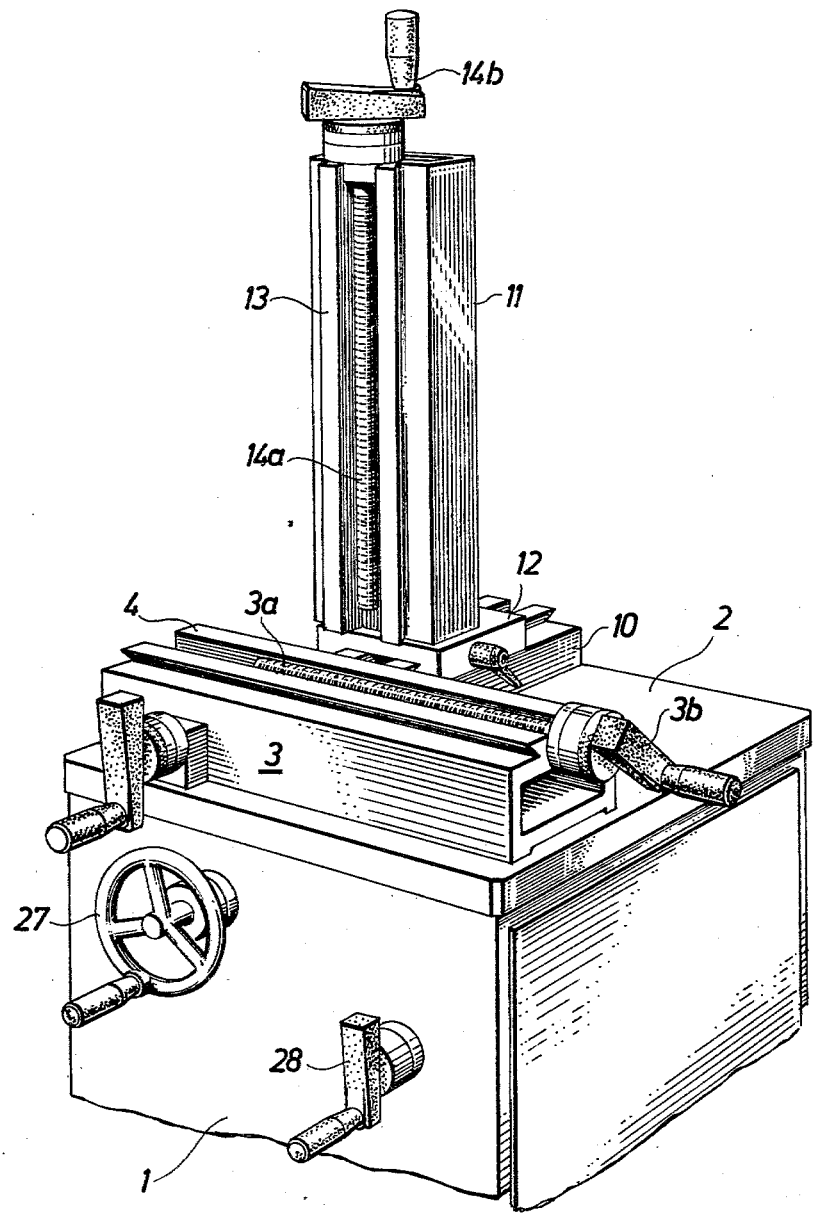
FIG. 2 is a perspective view showing the main components of a machine according to a second embodiment.

Along one of the two lateral edges of supporting plate 2 which are perpendicular to the longitudinal direction of bed 3 there is mounted a second similar bed 10. In FIG. 1 the second bed 10 is obscured by the worktable 6 but clearly visible in FIG. 2. The second bed 10 supports a vertical column 11 which is displaceable along bed 10. According to the embodiment shown in FIG. 2, column 11 is also rotatable around its longitudinal axis, namely by means of another intermediate slide 12. The presence of intermediate slide 12 further facilitates the practical handling of the machine but it is not necessary.

Column 11 preferably has the same cross-section as beds 3 and 10. In other words, it comprises two guides 13 of dovetail cross-section. Along those guides 13 there is, by means of a lead screw 14a having a crank 14b, displaceable a further intermediate slide 14 (FIG. 1), the outer portion of which is freely rotatable through 360° around a horizontal axis. As seen in FIG. 1, slide 14 is in engagement with the guides 15 of a plate, or table, 16. Plate 16 has mounting grooves 17 of inverted T crosssection and, preferably, plate 16 is similar to worktable 6 so that these two components are interchangeable. Plate 16 is relative to intermediate slide 14, displaceable by means of a lead screw controlled by a crank 18. By means of bolts, the heads of which engage grooves 17, table 16 supports a foot plate 19 for a drive unit 20. Drive unit 20 comprises an electrical motor 21, an angular gear 22 and a drive shaft 23. Reference numeral 24 refers to the electric current supply cable. The drive unit 20 is rotatable relative to foot plate 19 through 360° around a horizontal axis and the foot plate can be fixed in different positions along table 16.

The drive shaft, or spindle, 23 can be provided with a tool holder, such as a chuck for receiving drills or milling tools. This has been shown in FIG. 3, where reference numeral 25 designates the chuck. However, alternatively, spindle 23 can be provided with a jaw chuck or a collet chuck for the retainment of a workpiece. In that case the machine may operate as a turning lathe, illustrated in FIG. 4, or, by way of example, as a circular grinding machine. It is important to note that this conversion only calls for an exchange of the chuck, fixation of one or more suitable tools on worktable 6 and a suitable selection of the relative positions of the main components of the machine.

Figure 3:
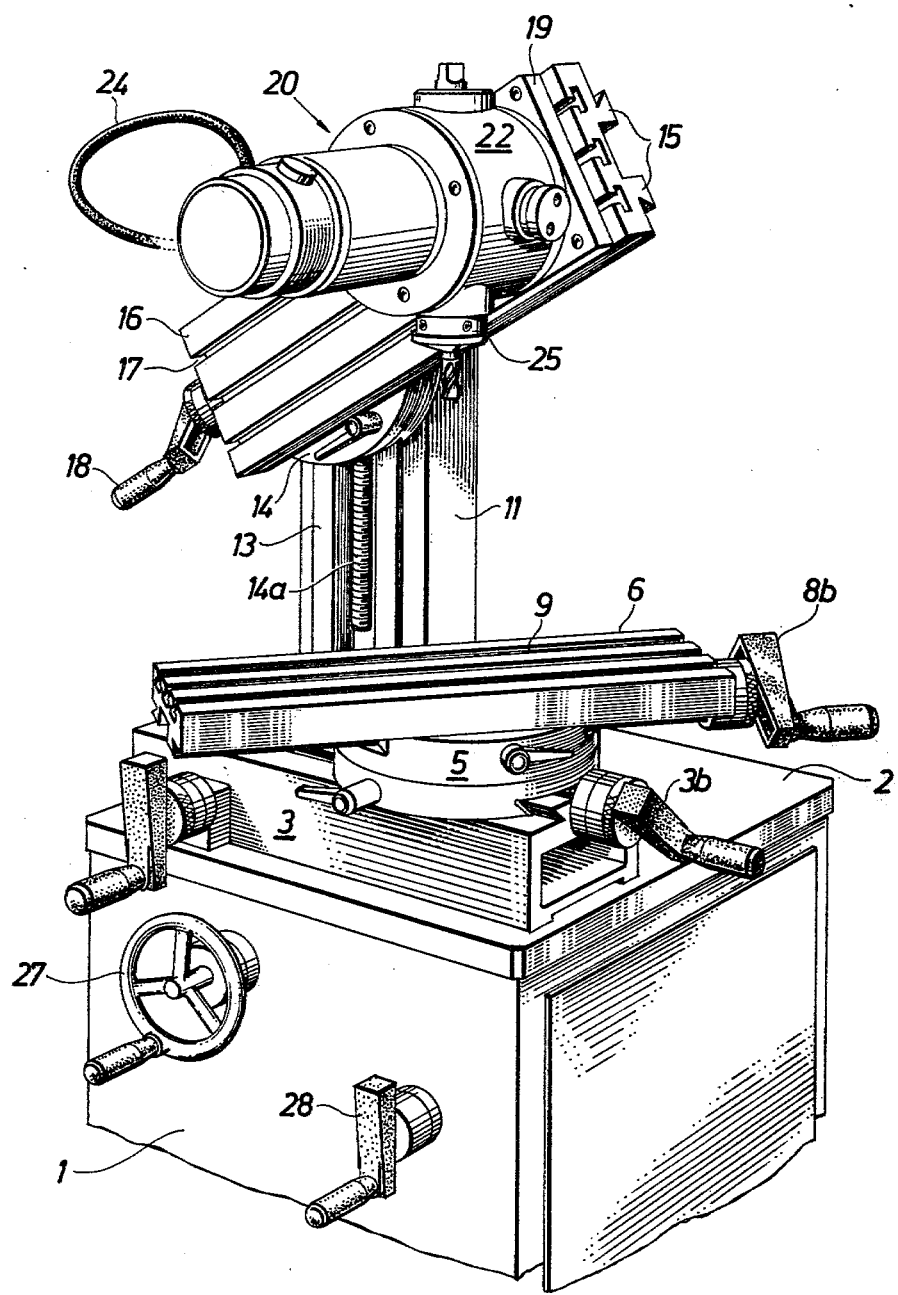
FIG. 3 illustrates the machine of FIG. 1 provided with a milling tool and set in another position.
Figure 4:
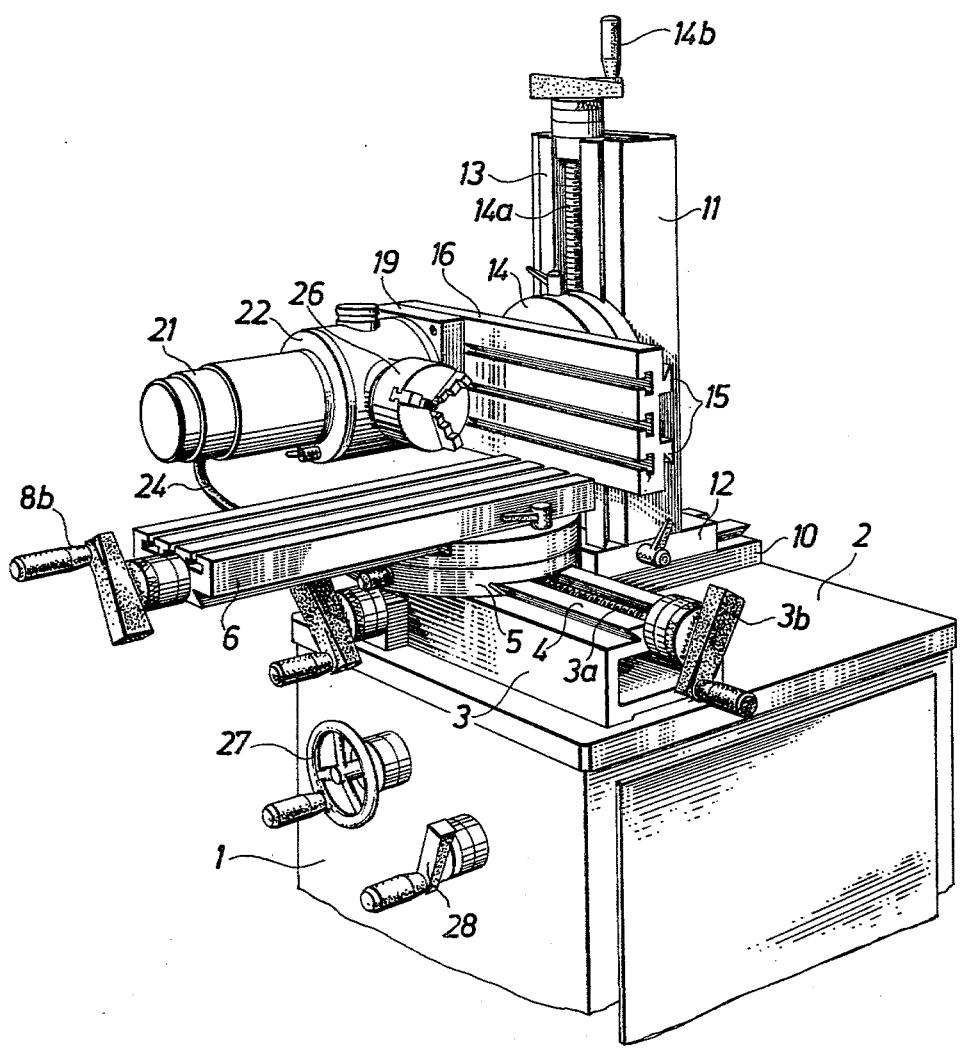
FIG. 4 illustrates the machine of FIG. 1 converted into a turning lathe.
Figure 5:
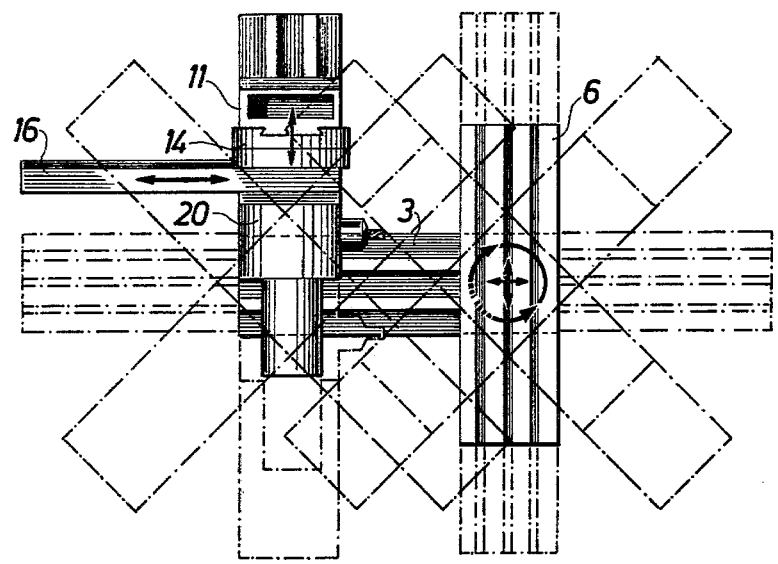
FIG. 5 is a horizontal view and FIG. 6 a vertical view diagrammatically illustrating the great useful range of the machine.
Figure 6:
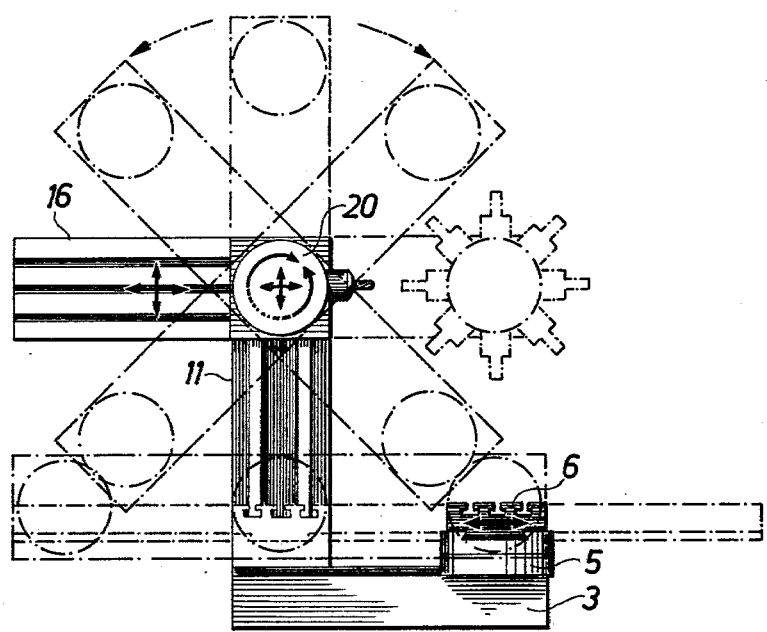

The horizontal view of FIG. 5 and the corresponding vertical view of FIG. 6 concretely illustrate the great useful range of the machine and its corresponding versatility. As far as the latter aspect is concerned, the following facts should be especially mentioned. When the machine operates according to FIG. 4, worktable 6 may have several tools, e.g. turning tools, grinding tools, etc. When the machine is adjusted as shown in FIG. 3, worktable 6 can support a workpiece to be machined along surfaces forming various angles with the horizontal plane. All that has to be done in preparation of such a machining is to turn plate 16 into a desired inclined position by means of intermediate slide 14, whereupon drive unit 20 is displaced to a suitable position on plate 16, turned as necessary in relation thereto and then fixed in that position. The feeding of the workpiece relative to the tool takes place by displacement of plate 16, of worktable 6 or of both. Machining of a surface of the workpiece inclined at a different angle only requires adjustment of the setting of intermediate slide 14, meaning that the workpiece may all the time assume one and the same position on worktable 6, which very much simplifies and accelerates the work.

Plate 2 can be rotated relative to frame 1, e.g. by means of a wheel 27. This means that the operator can carry out all working steps remaining seated in one and the same position. Control knob 28 is for adjustment of the RPM of spindle or drive shaft 23.

It should be noted that the terms appearing in the claims and in the specification shall be construed in a functional and not in a literal sense. By way of example, it could be mentioned that the beds have been referred to as each comprising one guide only, since this is the conventional configuration. It is, however, obvious that each bed may as well comprise two or more guides.

What I claim is:
1. A universal type machine tool, comprising:
   a frame (1, 2);
   a horizontal bed (3) on said frame and having an elongated guide (4);
   a first rotatable intermediate slide means (5) displaceably and feedably mounted on said guide (4) of said bed (3), said first intermediate slide means (5) being rotatable around a vertical axis;
   an elongated rectangular table (6) supported on said first intermediate slide means (5) and being rotatable about said vertical axis, said rectangular table (6) being displaceable and feedable in the direction of its longest side relative to said first intermediate slide means (5);
   an elongated vertical column (11) mounted to said frame, said column (11) having a vertically directed longitudinal axis;
   a second rotatable intermediate slide means (14) mounted to said vertical column (11) and being displaceable and feedable along said longitudinal axis of said vertical column (11), said second intermediate slide means (14) being rotatable around a horizontal axis;
   an elongated rectangular plate (16) mounted to said second intermediate slide means (14) and being displaceable and feedable in the direction of its longest side relative to said second intermediate slide means (14), said rectangular plate (16) also being rotatable about said horizontal axis;
   feed means (18) coupled to said rectangular plate (16) for feeding said rectangular plate (16) relative to said second intermediate slide means (14) in the direction of the longest side of said rectangular plate (16); and
   a drive unit (20) selectably mountable to said displaceably feedable rectangular plate (16) and, when mounted to said rectangular plate (16), being displaceable relative to said rectangular plate in the direction of the longest side of said rectangular plate (16) for fixation of said drive unit (20) in different positions, said drive unit (20) being turnable relative to said rectangular plate (16) around a horizontal axis.

2. The machine tool of claim 1, wherein said column (11) has a guide (13) which is of substantially identical configuration as the guide (4) along which said second intermediate slide means (14) is displaceably mounted to said column (11), and wherein said rectangular table (6) and rectangular plate (16) along with their associated intermediate slides (5, 14) are interchangeable on said guides.

3. The machine tool of claim 1 or 2, comprising a second horizontal bed (10), and wherein said column (11) is horizontally displaceable along said second bed (10).

4. The machine tool of claim 3, wherein said first intermediate slide means (5) is displaceable along said horizontal bed (3) in a first horizontal direction, and wherein said column 11 is horizontally displaceable along said second bed in a direction perpendicular to the direction of displacement of said first intermediate slide means (5).

5. The machine tool of claim 3, comprising a third rotatable intermediate slide means (12) coupling said column (11) to said second bed (10).

6. The machine tool of claim 1 or 2, wherein said frame (1, 2) comprises a housing structure (1) and a plate (2) mounted on said housing in a horizontal plane, said plate (2) being turnable relative to said housing (1) around a vertical axis.

7. The machine tool of claim 1, comprising a lead screw means (8a, 8b) coupled to said rectangular table (6) for feedably displacing said rectangular table relative to said first intermediate slide means (5).

8. The machine tool of claim 1 or 7, wherein said feed means comprises a lead screw means (18) coupled to said rectangular plate (16) for feedably displacing said rectangular plate (16) relative to said second intermediate slide means (14).

* * * * *